United States Patent [19]
Culver

[11] 3,755,701
[45] Aug. 28, 1973

[54] SELECTIVELY REVERSIBLE STEP MOTOR

[75] Inventor: Mark N. Culver, Davison, Mich.

[73] Assignee: General Motors Corporation, Detroit, Mich.

[22] Filed: Sept. 14, 1972

[21] Appl. No.: 288,958

[52] U.S. Cl. .................................. 310/49, 310/163
[51] Int. Cl. .......................................... H02k 37/00
[58] Field of Search ............. 310/49, 165, 162–164, 310/269, 41, 156; 318/138, 685, 696

[56] References Cited
UNITED STATES PATENTS

| | | | |
|---|---|---|---|
| 3,205,383 | 9/1965 | Hurst | 310/162 |
| 2,541,830 | 2/1951 | Phaneuf | 310/163 |
| 3,495,107 | 2/1970 | Haydon | 310/49 |
| 3,504,253 | 3/1970 | Kavanaugh | 310/49 |
| 3,253,169 | 5/1966 | Haydon | 310/162 |

Primary Examiner—R. Skudy
Attorney—Eugene W. Christen, Richard G. Stohr et al.

[57] ABSTRACT

A selectively reversible step motor. Two field pole pieces, each having a plurality of circumferentially arranged salient field pole tips, are positioned on respective opposite sides of a toroidal field coil with the salient field pole tips being interleaved and extending in the same direction substantially parallel to the axis of and beyond an edge of the field coil to define a cylinder-like recess. A disk type rotor, having a series of premagnetized alternate polarity magnetic rotor poles about the periphery thereof, is mounted for rotation within the cylinder-like recess and an auxiliary direction of rotation selecting pole piece, having a plurality of circumferentially arranged salient pole tips equal in number to the total of salient field pole tips, is mounted for rotation about the axis of the rotor with the salient pole pieces thereof interleaved between adjacent salient field pole tips of the field pole pieces for selectively determining the direction of rotor rotation.

3 Claims, 9 Drawing Figures

PATENTED AUG 28 1973

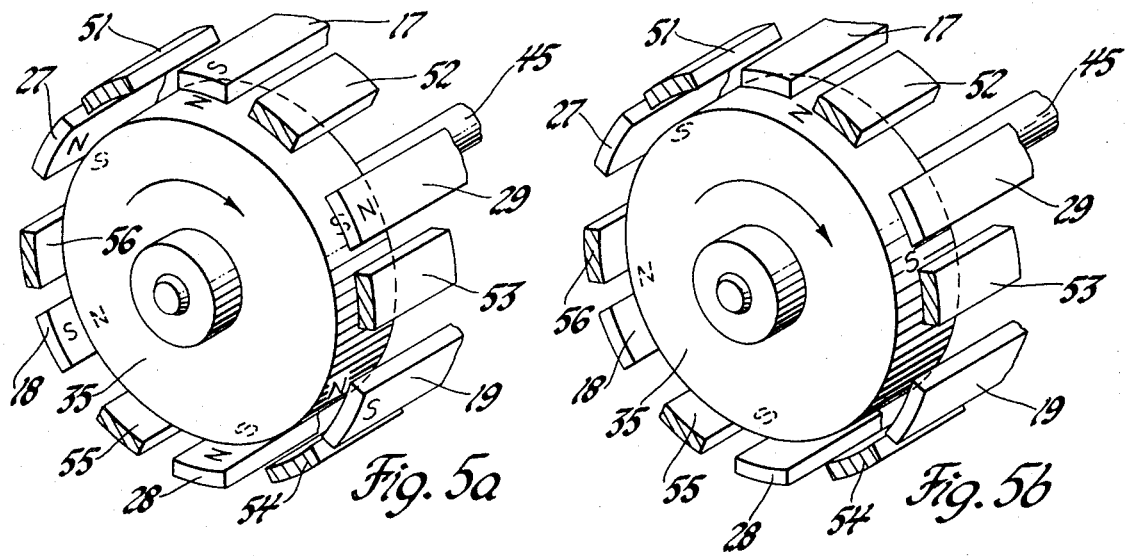
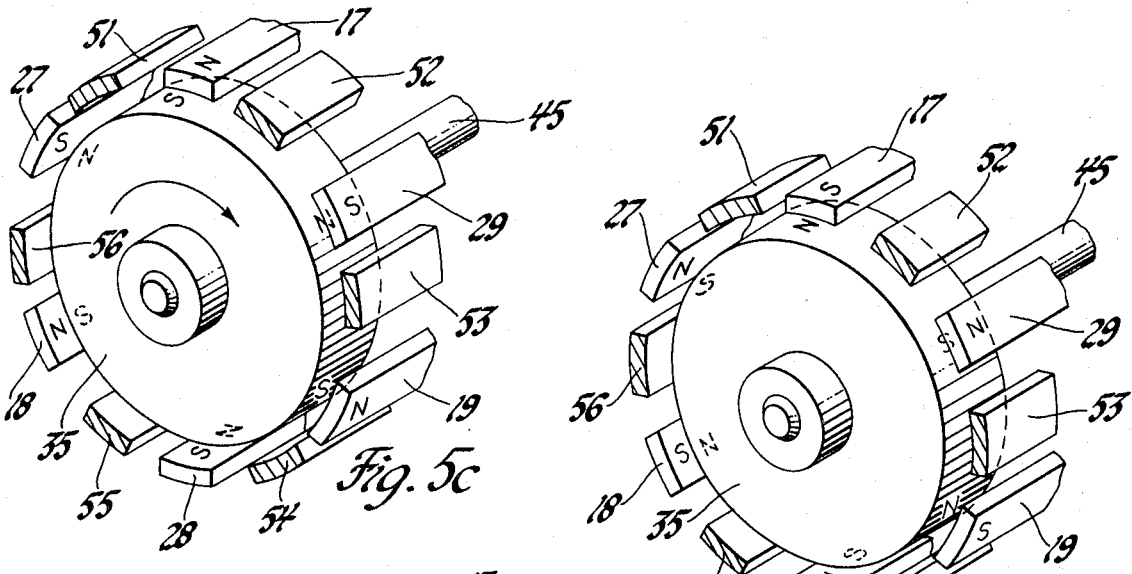
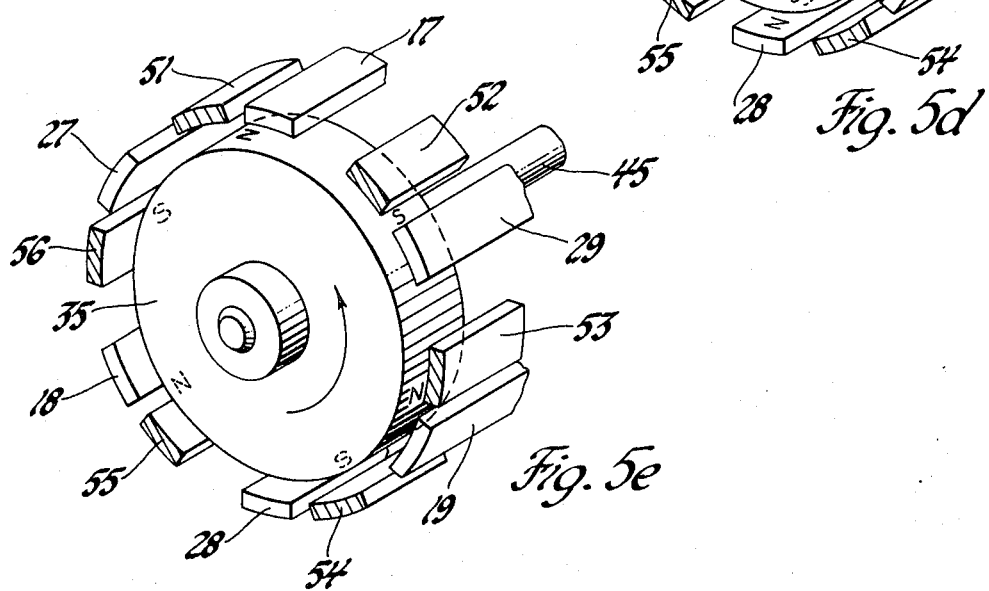

SELECTIVELY REVERSIBLE STEP MOTOR

This invention is directed to step motors and, more specifically, to selectively reversible step motors.

Prior art selectively reversible step motors required two separate field coils for providing two directions of rotor rotation. That is, to provide rotor rotation in a clockwise direction, one of the field coils was energized and to provide rotor rotation in the opposite direction, the other field coil was energized. The complex switching arrangements required to selectively energize either of two field coils and the requirement of additional field coil windings have proved to be disadvantages of step motors of the prior art type.

It is, therefore, an object of this invention to provide an improved selectively reversible step motor.

It is an additional object of this invention to provide an improved selectively reversible step motor having a single field coil.

It is an additional object of this invention to provide an improved selectively reversible step motor having an single field coil and a plurality of salient field pole tips surrounding the rotor wherein an auxiliary direction of rotor rotation determining pole piece having a plurality of salient pole tips is mounted for rotation about the axis of the motor rotor with the salient pole tips thereof interleaved between adjacent field pole tips.

In accordance with this invention, a selectively reversible step motor is provided wherein first and second groups of a plurality of salient field pole tips are located in magnetic coupling relationship with respective opposite sides of a toroidal field coil and interleaved for producing a series of circumferentially spaced opposite polarity magnetic filed poles upon each energization of the field coil which produce rotation of a disk type rotor, having a series of circumferentially spaced premagnetized alternate polarity magnetic rotor poles, mounted for rotation with the rotor poles closely adjacent the field pole tips and an auxiliary pole piece having a plurality of salient pole tips, equal in number to the total of the field pole tips, is mounted for rotation about the axis of the rotor with the pole tips thereof interleaved between adjacent field pole tips for selectively determining the direction of rotor rotation.

For a better understanding of the present invention, together with additional objects, advantages and features thereof, reference is made to the following description and accompanying drawing in which:

FIGS. 5a through 5e, inclusive, are fragmentary perspective views of the rotor and field pole pieces of the selectively reversible step motor of this invention.

Throughout the several figures of the drawing, like elements have been assigned like characters of reference.

Figures 1, 2, 3, 4:
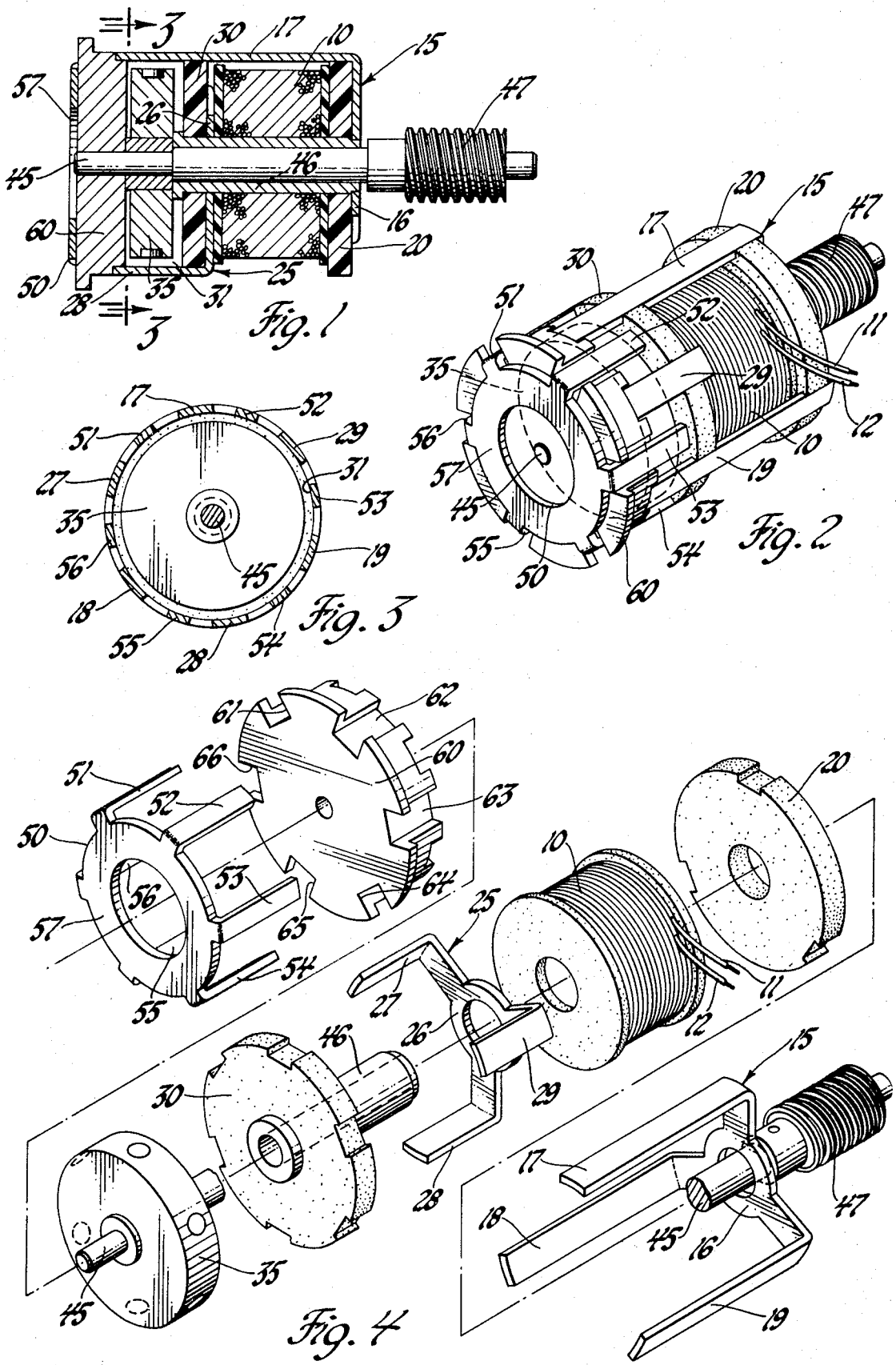
FIG. 1 is a cross-sectional view of a selectively reversible step motor of this invention.
FIG. 2 is a perspective view of a selectively reversible step motor of this invention.
FIG. 3 is a cross-sectional view of FIG. 1 taken along line 3—3 and looking in the direction of the arrows.
FIG. 4 is an exploded perspective view of the selectively reversible step motor of this invention.

A cross-section view of the selectively reversible step motor of this invention and a perspective view of the step motor of this invention is set forth in respective FIGS. 1 and 2. This step motor comprises a toroidal field coil 10 of a plurality of electrical conductor turns about a common axis arranged to be energized through input leads 11 and 12, FIGS. 2 and 4, by an external source of direct current potential, not shown, for producing magnetic flux. As the external source of direct current potential may be any convenient direct current power supply or battery and, per se, forms no part of this invention, in the interest of reducing drawing complexity, it has not been illustrated in the drawing.

Also provided are first and second groups of a plurality of field pole tips in magnetic coupling relationship with respective opposite sides of the field coil 10 and interleaved for producing a series of circumferentially spaced alternate magnetic polarity field poles upon each energization of the field coil 10. To provide the first and second groups of a plurality of field pole tips, first and second field pole pieces 15 and 25, best seen in FIG. 4, of magnetic material having a plurality of circumferentially arranged salient field pole tips, the salient field pole tips of one of the pole pieces being longer than and equal in number to the salient field pole tips of the other, are positioned on respective opposite sides of field coil 10 with the salient field pole tips being interleaved and extending in the same direction substantially parallel to the axis of and beyond an edge of the field coil to define a cylinder-like recess. Each of field pole pieces 15 and 25 is comprised of a circular body portion 16 and 26, respectively, having a plurality of salient pole tips extending from the periphery thereof and substantially normal thereto. The salient field pole tips of field pole piece 15 are referenced by the numerals 17, 18 and 19 and the salient field pole tips of field pole piece 25 are referenced by the numerals 27, 28 and 29. It may be noted that each of field pole pieces 15 and 25 have the same number, three, of salient field pole tips and that the salient field pole tips 17, 18 and 19 of field pole piece 15 are longer than salient field pole tips 27, 28 and 29 f field pole piece 25. The field pole pieces 15 of 25 are positioned on respective opposite sides of field coil 10 with the salient field pole tips being interleaved and extending in the same direction substantially parallel to the axis of and beyond an edge of field coil 10, as best seen in FIG. 2, to define a cylinder-like recess 31, as best seen in FIG. 1. Field pole piece 15 may be maintained in position by a disk of insulating material 20 and field pole piece 25 may be maintained in position by a disk of insulating material 30.

A disk type rotor member 35 having a series of radially premagnetized alternate polarity magnetic rotor poles of a number equal to the number of the salient field pole tips circumferentially spaced about the periphery thereof is mounted for rotation within cylinder-like recess 31 with the rotor poles closely adjacent the salient field pole tips. One method of mounting rotor member 35 is a shaft member 45 extending through a sleeve type bearing 46, FIG. 1, retained within a central bore of each of insulating disks 20 and 30 and terminating in a gear or similar driven device 47 at the opposite end. Rotor member 35 may be made up of a permanent magnetic material or it may be rotor member having at least an outer periphery of permanent magnetic material capable of being radially premagnetized and retaining the magnitization in a manner well known in the art.

To provide the selectively reversible feature, an auxiliary pole piece of magnetic material 50 having a plurality of pole tips, equal in number to the total of the field pole tips, mounted for rotation about the axis of rotor member 35 with the pole tips thereof interleaved between adjacent field pole tips for selectively determining the direction of rotor rotation is provided. In the drawing, and without intention or inference of a limitation thereto, the auxiliary pole piece of magnetic material is shown to be comprised of a circular body portion 57 having a plurality of circumferentially arranged salient pole tips 51, 52, 53, 54, 55 and 56 extending from the periphery thereof and substantially normal thereto. To mount the auxiliary pole piece 50 for rotation about the axis of rotor 35 with the salient pole tips thereof interleaved between adjacent salient field pole tips of field pole pieces 15 and 25, an end cap member 60 of a non-magnetic material having slots 61, 62, 63, 64, 65 and 66 which accommodate the respective salient pole tips 51, 52, 53, 54, 55 and 56 of the auxiliary pole piece 50 is provided. Each of the accommodating slots 61, 62, 63, 64 65 and 66 of end cap member 60 is of a width greater than the width of the salient pole tips of the auxiliary pole piece 50 so that the salient pole tips of auxiliary pole piece 50 may be rotated within the confines of the accommodating slots in end cap member 60.

Referring to FIGS. 5a through 5e, inclusive, upon the energization of field coil 10 in a first direction from a direct current potential source with the auxiliary pole piece revolved about the axis of rotor 35 in the extreme counterclockwise position as looking at the figures, the magnetic rotor poles pull into alignment with the magnetic field poles of the opposite polarity as shown in FIG. 5a. Upon the deenergization of field coil 10, the magnetic rotor poles pull into alignment midway between the salient field pole tips of field pole pieces 15 and 25 and the next nearest adjacent salient pole tip of auxiliary pole piece 50 to rotate rotor 35 in a clockwise direction as looking at FIG. 5b. Upon the next energization of field coil 10 in a second opposite direction from a direct current potential source, the magnetic rotor poles pull into alignment with the next closest magnetic field pole of the opposite polarity to continue the rotation of rotor 35 in a clockwise direction as looking at FIG. 5c. Upon the deenergization of field coil 10, the magnetic rotor poles again pull into alignment midway between each salient field pole tip and the next nearest adjacent salient pole tip of auxiliary pole piece 50 to rotate rotor 35 in a clockwise direction as looking at FIG. 5b.

With the auxiliary pole piece 30 rotated in the extreme clockwise position within the confines of the accommodating slots in end cap member 60 as looking at FIG. 5e, rotor 35 would be rotated in the opposite direction. With the auxiliary pole piece 30 rotated to place the salient pole tips thereof midway between the salient field pole tips as shown in FIG. 5d, the forces are balanced and no rotation of rotor 35 occurs.

To provide for the alternate energization of field coil 10 in first and second opposite polarity directions, a simple two-pole double-throw reversing switch arrangement may be employed or, more preferably, a more sophisticated electronic circuit arrangement which functions as a reversing switch may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A selectively reversible step motor comprising: a field coil of a plurality of electrical conductor turns around a common axis arranged to be energized by an external source of direct current potential for producing magnetic flux; first and second groups of a plurality of field pole tips in magnetic coupling relationship with respective opposite sides of said field coil and interleaved for producing a series of circumferentially spaced alternate polarity magnetic field poles upon each energization of said field coil; a disk type rotor having a series of circumferentially spaced premagnetized alternate polarity magnetic rotor poles of a number equal to the number of said field pole tips mounted for rotation with said rotor poles closely adjacent said field pole tips whereby said rotor is rotated upon each energization of said field coil; and an auxiliary pole piece of magnetic material having a plurality of pole tips, equal in number to the total of said field pole tips, mounted for rotation about the axis of said rotor with said pole tips thereof interleaved between adjacent said field pole tips for selectively determining the direction of rotor rotation.

2. A selectively reversible step motor comprising: a field coil of a plurality of electrical conductor turns around a common axis arranged to be energized by an external source of direct current potential for producing magnetic flux; first and second field pole pieces of magnetic material having a plurality of circumferentially arranged salient field pole tips, the said salient field pole tips of one of said pole pieces being longer than and equal in number to said salient pole tips of the other, positioned on respective opposite sides of said field coil with said salient field pole tips being interleaved and extending in the same direction substantially parallel to the axis of and beyond an edge of said field coil to define a cylinder-like recess for producing a series of circumferentially spaced alternate polarity magnetic field poles upon each energization of said field coil; a disk type rotor having a series of radially premagnetized alternate polarity magnetic rotor poles of a number equal to the number of said salient field pole tips circumferentially spaced about the periphery thereof mounted for rotation within said cylinder-like recess with said rotor poles closely adjacent said salient field pole tips; and an auxiliary pole piece of magnetic material having a plurality of circumferentially arranged salient pole tips, equal in number to the total of said salient field pole tips of said first and second field pole pieces, mounted for rotation about the axis of said rotor with said salient pole tips thereof interleaved between adjacent said salient field pole tips of said field pole pieces for selectively determining the direction of rotor rotation.

3. A selectively reversible step motor comprising: a field coil of a plurality of electrical conductor turns around a common axis arranged to be energized by an external source of direct current potential for producing magnetic flux; first and second field pole pieces of magnetic material comprised of a circular body portion having a plurality of salient field pole tips extending from the periphery thereof and substantially normal thereto, the said salient field pole tips of one of said pole pieces being longer than and equal in number to said salient field pole tips of the other, positioned on respective opposite sides of said field coil with said salient field pole tips being interleaved and extending in the same direction substantially parallel to the axis of and beyond an edge of said field coil to define a cylinder-like recess for producing a series of circumferentially spaced alternate polarity magnetic field poles upon each energization of said field coil; a disk type rotor having a series of radially premagnetized alternate polarity magnetic rotor poles of a number equal to the number of said salient field pole tips circumferentially spaced about the periphery thereof mounted for rotation within said cylinder-like recess with said rotor poles closely adjacent said salient pole tips; and an auxiliary pole piece of magnetic material comprised of a circular body portion having a plurality of salient pole tips, equal in number to the total of said salient field pole tips of said first and second field pole pieces, extending from the periphery thereof and substantially normal thereto mounted for rotation about the axis of said rotor with said salient pole tips thereof interleaved between adjacent said salient field pole tips of said field pole pieces for selectively determining the direction of rotor rotation.

* * * * *